United States Patent
Hsu et al.

(10) Patent No.: US 8,446,436 B2
(45) Date of Patent: May 21, 2013

(54) OVERDRIVE TOPOLOGY STRUCTURE FOR TRANSMISSION OF RGB SIGNAL

(75) Inventors: Shou-Kuo Hsu, Taipei Hsien (TW);
Yu-Chang Pai, Taipei Hsien (TW);
Cheng-Shien Li, Taipei Hsien (TW);
Jia-Chi Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 988 days.

(21) Appl. No.: 12/483,260

(22) Filed: Jun. 12, 2009

(65) Prior Publication Data

US 2010/0289601 A1 Nov. 18, 2010

(30) Foreign Application Priority Data

May 15, 2009 (CN) .......................... 2009 1 0302360

(51) Int. Cl.
*G09G 5/10* (2006.01)
*H01P 3/00* (2006.01)

(52) U.S. Cl.
USPC ........... 345/690; 345/691; 345/692; 333/236; 333/237

(58) Field of Classification Search
USPC ................... 345/82–101, 170, 204–214, 418, 345/501–530, 589, 615, 690–692; 715/810; 333/5, 26, 24 R, 236–238
See application file for complete search history.

(56) References Cited

U.S. PATENT DOCUMENTS

| | | | | | |
|---|---|---|---|---|---|
| 5,565,896 | A | * | 10/1996 | Suski | 345/211 |
| 5,920,355 | A | * | 7/1999 | Kim | 348/569 |
| 5,966,056 | A | * | 10/1999 | Thornton | 333/5 |
| 6,262,629 | B1 | * | 7/2001 | Stengel et al. | 330/124 R |
| 6,356,106 | B1 | * | 3/2002 | Greeff et al. | 326/30 |
| 7,042,940 | B2 | * | 5/2006 | Yasunishi et al. | 375/240.01 |
| 7,397,320 | B1 | * | 7/2008 | Bokhari | 333/1 |
| 7,443,263 | B2 | * | 10/2008 | Gruchalla | 333/26 |
| 7,711,938 | B2 | * | 5/2010 | Wise et al. | 712/300 |
| 2002/0084800 | A1 | * | 7/2002 | Crittenden et al. | 326/30 |
| 2004/0174191 | A1 | * | 9/2004 | Radelinow | 327/65 |
| 2005/0138261 | A1 | * | 6/2005 | Marushak et al. | 710/316 |
| 2006/0066548 | A1 | * | 3/2006 | Yoneyama et al. | 345/89 |
| 2006/0176074 | A1 | * | 8/2006 | Van Epps et al. | 326/30 |
| 2006/0233278 | A1 | * | 10/2006 | Zerbe et al. | 375/286 |
| 2007/0132674 | A1 | * | 6/2007 | Tsuge | 345/77 |
| 2008/0180432 | A1 | * | 7/2008 | Lee | 345/214 |
| 2009/0045886 | A1 | * | 2/2009 | Gruchalla | 333/26 |
| 2009/0303262 | A1 | * | 12/2009 | Son et al. | 345/690 |

* cited by examiner

*Primary Examiner* — Prabodh M Dharia
(74) *Attorney, Agent, or Firm* — Altis Law Group, Inc.

(57) ABSTRACT

An overdrive topology structure for transmission of a RGB signal includes a signal sending terminal, a signal receiving terminal, and a transmission line to transmit the RGB signal from the signal sending terminal to the signal receiving terminal. The transmission line is divided into a number of section transmission lines. A node is formed between every two section transmission lines. An impedance of a first section transmission line approaching to the signal sending terminal is less than an impedance of a second section transmission line approaching to the first section transmission line to overdrive the RGB signal at a first node between the first and second section transmission lines. At least one node except the first node is grounded via a resistor. An equivalent resistance of the resistor is equal to a resistance of the first resistor.

9 Claims, 3 Drawing Sheets

OVERDRIVE TOPOLOGY STRUCTURE FOR TRANSMISSION OF RGB SIGNAL

BACKGROUND

1. Technical Field

The present disclosure relates to topology structures, and particularly to an overdrive topology structure for transmission of a red-green-blue (RGB) signal.

2. Description of Related Art

In most electronic devices, picture transmission depends on an RGB signal. In ordinary topology structure for a RGB signal transmission circuit, impedance matching occurs at a front terminal thereof. Therefore, rise speed and amplitude of the RGB signal are not good, which influences the picture transmission.

DETAILED DESCRIPTION

Figure 1:
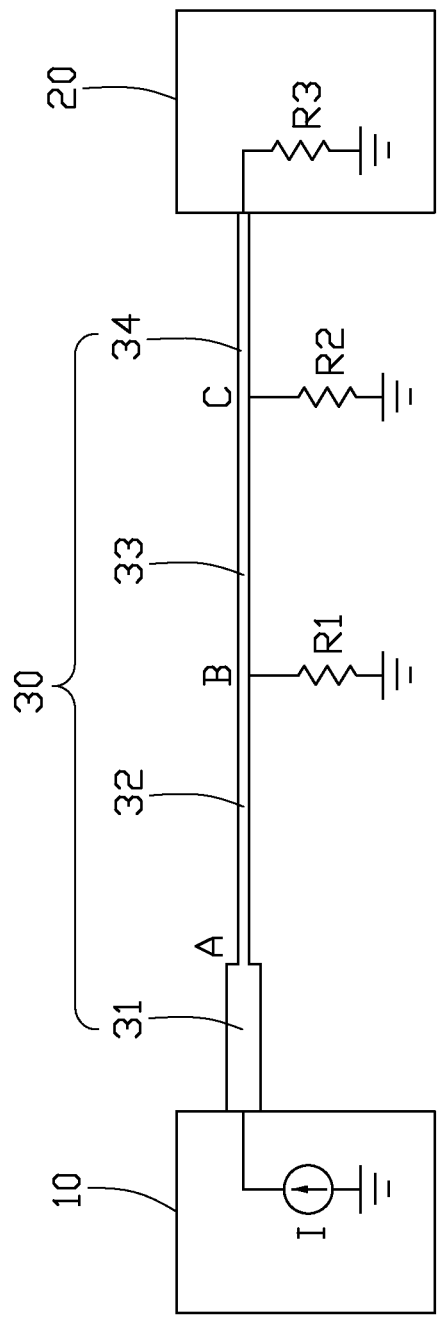
FIG. 1 is a schematic view of a first exemplary embodiment of an overdrive topology structure for transmission of a RGB signal, the overdrive topology structure including a signal receiving terminal.

Referring to FIG. 1, a first exemplary overdrive topology structure for transmission of a red-green-blue (RGB) signal includes a signal sending terminal 10, a signal receiving terminal 20, and a transmission line 30 connected between the signal sending terminal 10 and the signal receiving terminal 20. The transmission line 30 is divided into first to fourth section transmission lines 31-34.

The signal sending terminal 10 is to send the RGB signal. The signal receiving terminal 20 is to receive the RGB signal. The signal sending terminal 10 is connected to a first node A via the first section transmission line 31. The first node A is connected to a second node B via the second section transmission line 32. The second node B is grounded via a resistor R1, and connected to a third node C via the third section transmission line 33. The third node C is grounded via a resistor R2, and connected to the signal receiving terminal 20 via the fourth section transmission line 34. In the embodiment, a width of the first section transmission line 31 is greater than a width of the second section transmission line 32. A length of the third section transmission line 33 is greater than a length of the fourth section transmission line 34. An impedance of the first section transmission line 31 is less than an impedance of the second section transmission line 32.

In the embodiment, Z1, Z2, Z3, and Z4 denote the impedances of the first, second, third, and fourth section transmission lines 31-34, respectively. According to a standard of the RGB signal transmission, $Z1=37.5\Omega$. The impedance of the second section transmission line 32 is set as $50\Omega$ to satisfy that the impedance of the first section transmission line 31 approaching the signal sending terminal 10 is less than the impedance of the second section transmission line 32 adjacent to the first section transmission line 31, namely $Z2=50\Omega$. Overdrive occurs when a section transmission line is directly connected to another section transmission line with greater or lower impedance. In this case the transmission lines are configured so that overdrive occurs at the first node A between the first and second section transmission lines 31, 32, to improve an amplitude and a rise speed of the RGB signal. The impedances of the third and fourth section transmission lines are set as $50\Omega$ and $75\Omega$, namely, $Z3=50\Omega$, $Z4=75\Omega$. The signal sending terminal 10 includes a current source I. The signal receiving terminal 20 includes a resistor R3. Typically in the art, resistance of the resistor R3 is equal to $75\Omega$. Therefore, resistances of the parallel resistors R1 and R2 must be chosen so that $R1*R2/(R1+R2)=R3$ ($75\Omega$).

In other embodiments, the impedances of the second, third, and fourth section transmission lines 32, 33, and 34, and the resistances of the resistors R1 and R2 can be changed according to need. A material of the first section transmission 31 can be different from a material of the second section transmission line 32, but need to satisfy that the impedance of the first section transmission line 31 is less than the impedance of the second section transmission line 32 to overdrive the RGB signal at the first node A. At least one of the nodes except the first node A is grounded via a resistor, an equivalent resistance of the resistor is equal to a resistance of the resistor R3.

Figure 2:
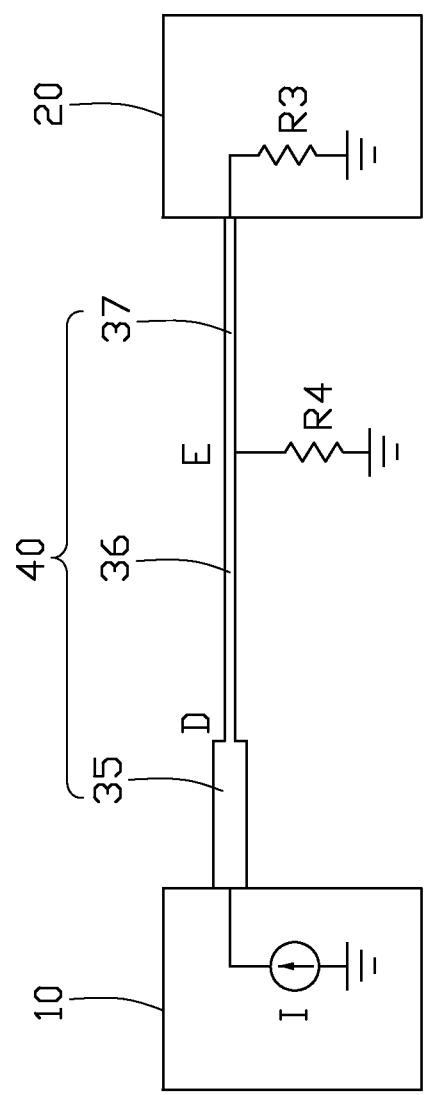
FIG. 2 is a schematic view of a second exemplary embodiment of an overdrive topology structure for transmission of a RGB signal, the overdrive topology structure including a signal receiving terminal.

Referring to FIG. 2, a second exemplary overdrive topology structure for transmission of a red-green-blue (RGB) signal includes a signal sending terminal 10, a signal receiving terminal 20, and a transmission line 40 connected between the signal sending terminal 10 and the signal receiving terminal 20. The transmission line 40 is divided into first to third section transmission lines 35-37. The signal sending terminal 10 is connected to a first node D via the first section transmission line 35. The first node D is connected to a second node E via the second section transmission line 36. The second node E is grounded via a resistor R4, and connected to the signal receiving terminal 20 via the third section transmission line 37. In the embodiment, a width of the first section transmission line 35 is greater than a width of the second section transmission line 36. A length of the second section line 36 is greater than a length of the third section line 37. An impedance of the first section transmission line 35 is less than an impedance of the second section transmission line 36, to overdrive the RGB signal at the first node D between the first and second section transmission lines 35, 36. Z1, Z2, and Z3 denote the impedances of the first, second, and, third section transmission lines 35-37, respectively. According to a standard of the RGB transmission, $Z1=37.5\Omega$. The impedances of the second and third section transmission lines are set as $50\Omega$ and $75\Omega$ respectively, namely $Z2=50\Omega$, $Z3=75\Omega$. A resistance of the resistor R4 is equal to $75\Omega$.

In other embodiments, the number and the lengths of the section transmission lines can be changed according to need. The number of the resistors can be changed.

Figure 3:
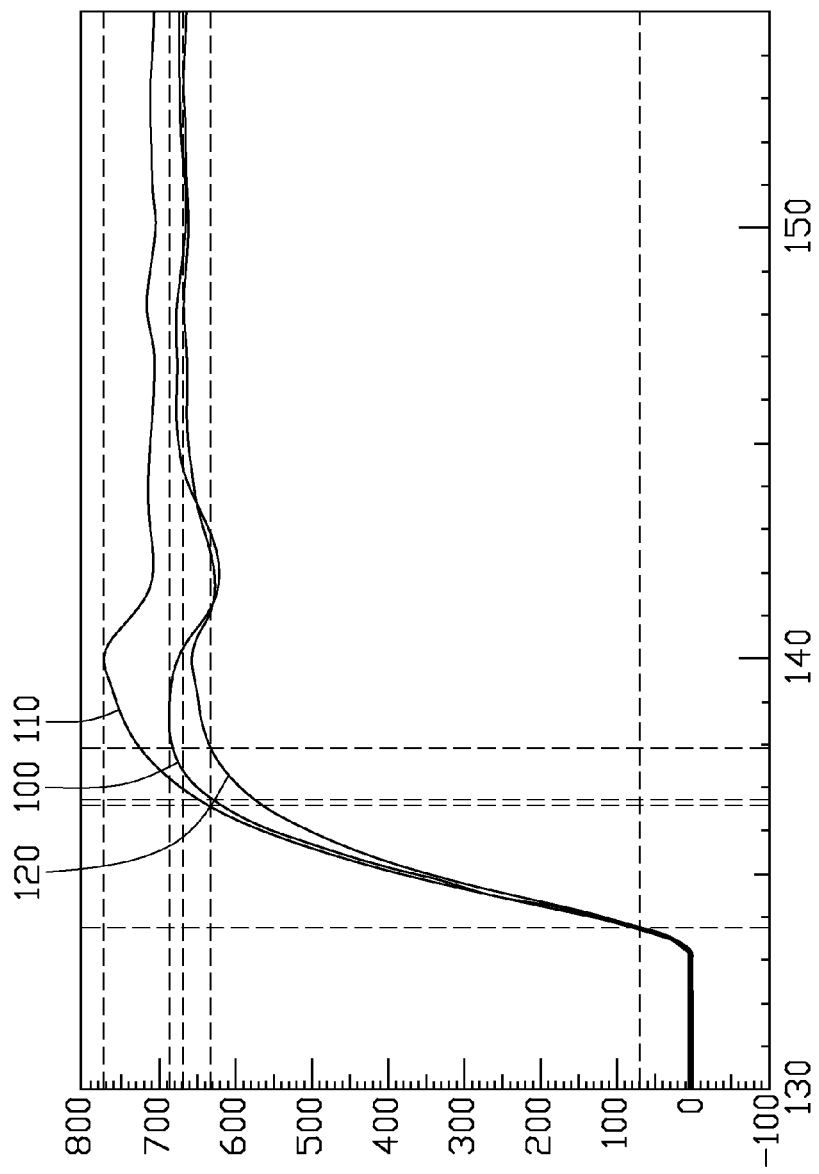
FIG. 3 is a comparative graph showing signal waveforms obtained at the signal receiving terminals of FIGS. 1 and 2, and at a signal receiving terminal of an ordinary topology structure for transmission of a RGB signal.

FIG. 3 is a comparative graph showing three signal waveforms 100, 110, and 120 obtained at the signal receiving terminal 20 of FIGS. 1 and 2, and a signal receiving terminal of a related art topology structure. X axis denotes a rise time of the RGB signal. Y axis denotes an amplitude of the RGB signal. Through comparison of the three signal waveforms in FIG. 3, it can be seen that the amplitude and rise speed of the RGB signal denoted by the signal waveforms 100 and 110 is greater than the amplitude and rise speed of the RGB signal denoted by the signal waveforms 120. Therefore, it shows if the overdrive occurs and it approaches the signal sending terminal 10, the rise speed and the amplitude of the RGB signal will be improved.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An overdrive topology structure for transmission of a red-green-blue (RGB) signal, comprising:
   a signal sending terminal to send the RGB signal;
   a signal receiving terminal to receive the RGB signal, the signal receiving terminal comprising a first resistor; and
   a transmission line to transmit the RGB signal from the signal sending terminal to the signal receiving terminal;
   wherein the transmission line is divided into a plurality of section transmission lines arranged in series, a node is formed between every two adjacent section transmission lines, an impedance of a first section transmission line approaching the signal sending terminal is less than an impedance of a second section transmission line approaching the first section transmission line, wherein at least one of the nodes except a first node between the first and second section transmission lines is grounded via a resistor, an equivalent resistance of the resistor is equal to a resistance of the first resistor.

2. The overdrive topology structure of claim 1, wherein a width of the first section transmission line is greater than a width of the second section transmission line.

3. The overdrive topology structure of claim 1, wherein the plurality of section transmission lines comprises first to third section transmission lines, to form the first node and a second node between the second and third section transmission lines, wherein the second node is grounded via a second resistor.

4. The overdrive topology structure of claim 3, wherein resistances of the first and second resistors are both 75Ω.

5. The overdrive topology structure of claim 3, wherein a length of the second section transmission line is greater than a length of the third section transmission line.

6. The overdrive topology structure of claim 1, wherein the plurality of section transmission lines comprises first to fourth section transmission lines, to form the first node, a second node between the second and third section transmission lines, and a third node between the third and fourth section transmission lines, wherein the second node is grounded via a second resistor, and the third node is grounded via a third resistor.

7. The overdrive topology structure of claim 6, wherein a resistance of the first resistor is 75Ω, resistances of the parallel second resistor and third resistor must be equal to the resistance of the first resistor.

8. The overdrive topology structure of claim 6, wherein a length of the third section transmission line is greater than a length of the fourth section transmission line.

9. The overdrive topology structure of claim 6, wherein the first section transmission line is made of a material different from those of second to fourth section transmission lines.

* * * * *